United States Patent
Sahu et al.

(10) Patent No.: US 10,749,697 B2
(45) Date of Patent: Aug. 18, 2020

(54) ELECTRONIC APPARATUS AND CONTROL METHOD THEREOF

(71) Applicant: SAMSUNG ELECTRONICS CO., LTD., Suwon-si, Gyeonggi-do (KR)

(72) Inventors: Samir Kant Sahu, Seoul (KR); Tae-jun Kwon, Suwon-si (KR); Dae-sung An, Bucheon-si (KR); Ah-reum Jeong, Suwon-si (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 0 days.

(21) Appl. No.: 15/565,581

(22) PCT Filed: Dec. 8, 2016

(86) PCT No.: PCT/KR2016/014372
§ 371 (c)(1),
(2) Date: Oct. 10, 2017

(87) PCT Pub. No.: WO2017/126806
PCT Pub. Date: Jul. 27, 2017

(65) Prior Publication Data
US 2018/0123809 A1    May 3, 2018

(30) Foreign Application Priority Data
Jan. 18, 2016 (KR) .................. 10-2016-0006054

(51) Int. Cl.
*H04L 29/08* (2006.01)
*H04L 12/12* (2006.01)
(Continued)

(52) U.S. Cl.
CPC .......... *H04L 12/12* (2013.01); *H04L 67/1093* (2013.01); *H04L 67/12* (2013.01);
(Continued)

(58) Field of Classification Search
CPC ..... H04L 12/12; H04L 67/1093; H04L 67/12; H04W 4/70; H04W 84/18; Y02D 50/40; Y02D 70/142; Y02D 70/144; Y02D 70/22
See application file for complete search history.

(56) References Cited

U.S. PATENT DOCUMENTS 9,332,172 B1 * 5/2016 Park .................. H04N 5/23219
2006/0259332 A1   11/2006 Brown
(Continued)

FOREIGN PATENT DOCUMENTS

KR    10-2010-0125792    10/2010
KR    10-1237165         2/2013
(Continued)

OTHER PUBLICATIONS

International Search Report for PCT/KR2016/014372 dated Mar. 22, 2017, 5 pages.

*Primary Examiner* — Kim T Nguyen
(74) *Attorney, Agent, or Firm* — Nixon & Vanderhye, P.C.

(57) ABSTRACT

An example electronic apparatus includes an information generator configured to generate information used to one function of a user terminal, a communicator configured to communicate with the user terminal, the server and a plurality of external apparatuses having a plurality of operation modes, and a controller configured to control the communicator: to attempt an access to the server at a first operation mode; in response to determining that the server is in a normal communication state based on the access attempt, to provide information generated by the information generator to the user terminal via the server; and in response to determining that the server is in a communication pending state based on the access attempt, to transmit a first mode changing signal for operating in a second operation mode,
(Continued)

which restricts the access to the server, to at least one of the plurality of external apparatuses.

17 Claims, 11 Drawing Sheets

(51) Int. Cl.
   *H04W 4/70* (2018.01)
   *H04W 84/18* (2009.01)

(52) U.S. Cl.
   CPC .............. *H04W 4/70* (2018.02); *H04W 84/18* (2013.01); *Y02D 50/40* (2018.01); *Y02D 70/142* (2018.01); *Y02D 70/144* (2018.01); *Y02D 70/22* (2018.01)

(56) References Cited

U.S. PATENT DOCUMENTS

| | | |
|---|---|---|
| 2006/0293788 A1 | 12/2006 | Pogodin |
| 2010/0076615 A1 | 3/2010 | Daniel et al. |
| 2010/0090841 A1 | 4/2010 | Zhang et al. |
| 2010/0102930 A1 | 4/2010 | McCoy |
| 2013/0305218 A1 | 11/2013 | Hirsch et al. |
| 2015/0105631 A1 | 4/2015 | Tran et al. |
| 2017/0108236 A1* | 4/2017 | Guan .................... G05B 19/04 |
| 2017/0324578 A1* | 11/2017 | Kang .................. H04L 12/2809 |

FOREIGN PATENT DOCUMENTS

| | | |
|---|---|---|
| WO | WO 2014/092464 | 6/2014 |
| WO | WO 2014/193166 | 12/2014 |
| WO | WO 2015/142034 | 9/2015 |

* cited by examiner

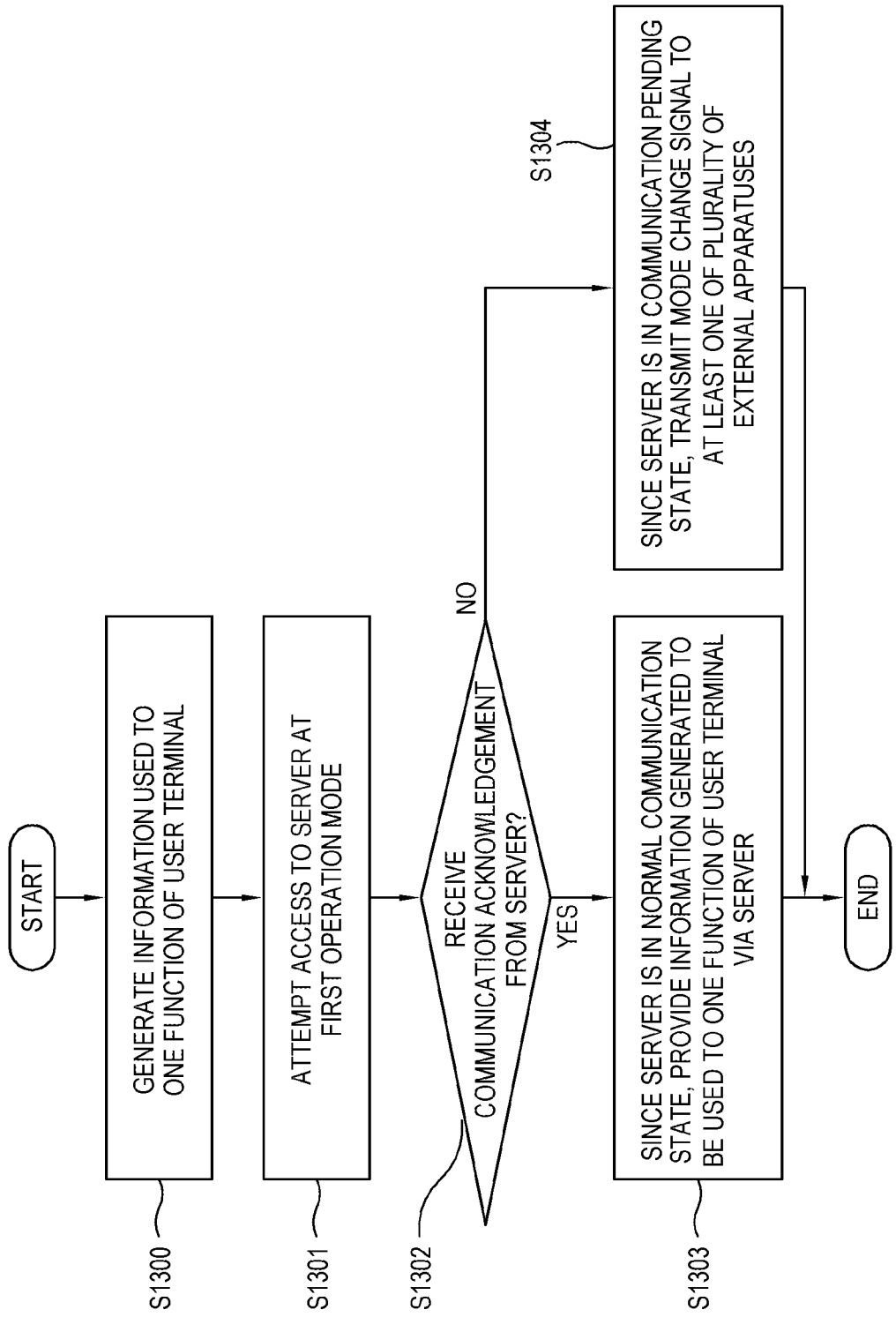

ELECTRONIC APPARATUS AND CONTROL METHOD THEREOF

This application is the U.S. national phase of International Application No. PCT/KR2016/014372 filed Dec. 8, 2016 which designated the U.S. and claims priority to KR Patent Application No. 10-2016-0006054 filed Jan. 18, 2016, the entire contents of each of which are hereby incorporated by reference.

TECHNICAL FIELD

Apparatuses and methods consistent with exemplary embodiments relate to an electronic apparatus, and more particularly, an electronic apparatus for enhancing an electric power efficiency and a channel occupation efficiency when communicating with a server, and a control method thereof.

BACKGROUND AND SUMMARY

An internet of things (IoT) as a new information communication infrastructure to network all things existing in the world to communicate among humans and/or objects with one another anytime or anywhere means an infrastructure for realizing a ubiquitous space. The ubiquitous space starts with environments and objects having computing devices with which specific functions are equipped, built in to allow the environments or the objects themselves to be intellectualized.

The IoT is a technology, which provides more convenient and safe life for us. FIGS. 1 and 2 illustrate implementation examples of the IoT. The IoT may be variously implemented, but referring to FIG. 1, implemented by a plurality of electronic apparatus 1a to 1d to detect surrounding environments and a user terminal 2 to receive the detected surrounding environment information from the plurality of electronic apparatus 1a to 1d. A user may receive the information detected by the plurality of electronic apparatus 1a to 1d in various types, for example, such as images, voices and so on, via the user terminal 2. Also, referring to FIG. 2, the IoT may be implemented in the form of a plurality of electronic apparatus 1e to 1i and a user terminal 2 to provide a command to the plurality of electronic apparatus 1e to 1i or to receive information from the plurality of electronic apparatus 1e to 1i. That is, the user may receive conditions or the like of the plurality of electronic apparatus 1e to 1i via the user terminal 2, and transmit a control command for changing conditions or operations of the plurality of electronic apparatus 1e to 1i using the user terminal 2. The IoT is not limited to the drawings and explanations as described above and may be implemented as various electronic apparatuses 1a to 1i and a user terminal 2 for controlling those electronic apparatuses 1a to 1i.

Referring to FIG. 4, there is illustrated an example in which a plurality of electronic apparatuses 1a to 1f provides information for a user terminal 2 via a server 4. The plurality of electronic apparatuses 1a to 1f may not only directly provide the information for the user terminal 2, but also as illustrated in the drawing, for a server 4 connected to a network or the like, so that the user in turn receives the information via the server 4.

In other words, the plurality of electronic apparatuses 1a to 1f periodically attempts accesses to the server 4 and if acknowledgements are received, transmits detected information, respectively.

Even if the server 4 cannot acknowledge the accesses of the electronic apparatuses 1a to 1f since it is in an uncommunicable state due to errors, communication congestion, power degradation or the like, the plurality of electronic apparatuses 1a to 1f periodically attempts accesses to the server 4 until the server 4 transmits the acknowledgements. As a result, there is a problem in that channel contention and power consumption in the respective electronic apparatuses 1a to 1f may occur.

Methods and apparatuses consistent with exemplary embodiments relate an electronic apparatus, which if a server does not respond, spreads a signal to other electronic apparatuses to restrict accesses thereof to the server, and a control method thereof.

In accordance with an aspect of an exemplary embodiment, there is provided an electronic apparatus having a plurality of operation modes with respect to an access to a server, the apparatus including: an information generator configured to generate information used to one function of a user terminal; a communicator configured to communicate with the user terminal, the server and a plurality of external apparatuses having the plurality of operation modes; and a controller configured to control the communicator: to attempt an access to the server at a first operation mode; in response to determining that the server is in a normal communication state based on the access attempt, to provide information generated by the information generator to the user terminal via the server; and in response to determining that the server is in a communication pending state based on the access attempt, to transmit a first mode changing signal for operating in a second operation mode, which restricts the access to the server, to at least one of the plurality of external apparatuses.

The controller may be more preferably configured to, in response to the first mode change signal being received from at least one of the plurality of external apparatuses via the communicator at the first operation mode, determine that the server is in the communication pending state, to control the communicator to transmit the first mode change signal to at least one of the plurality of external apparatuses and to change an operation mode of the electronic apparatus to the second operation mode.

The controller may be more preferably configured to restrict the operation of the information generator at the second operation mode.

The controller may be more preferably configured, in response to a second mode change signal for operating in the first operation mode being received from at least one of the plurality of external apparatuses via the communicator at the second operation mode, to control the communicator to transmit the second mode change signal to at least one of the plurality of external apparatuses and to change the operation mode of the electronic apparatus to the first operation mode.

The controller may be more preferably configured to control the communicator to periodically attempt the access to the server at the first operation mode.

The controller may be more preferably configured to determine that the server is in the communication pending state in response to a communication acknowledgement being not received from the server while attempting the access to the server more than predetermined critical number of times.

The controller may be more preferably configured to, in response to determining that the server is in the normal communication state based on the periodical access attempts after transmitting the first mode change signal to the at least one of the plurality of external apparatuses, control the communicator to transmit a second mode change signal for operating in the first mode to the at least one external apparatus to which the first mode change signal is transmitted.

The information used to the one function of the user terminal may more preferably include at least one of surrounding environment information and information on current condition of the electronic apparatus.

The apparatus may be more preferably further include a storage configured to store the information used to the one function of the user terminal, and the controller may be more preferably configured to, in response to determining that the server is in the communication pending state based the access attempt or operating in the second mode, store in the storage, the information used to the one function of the user terminal.

The controller may be more preferably configured to control the communicator to retrieve whether there is any external apparatus capable of storing information from among the plurality of external apparatuses and to transmit the information used to the one function of the user terminal to the retrieved external apparatus.

The controller may be more preferably configured to control the electronic apparatus to change the operation mode based on a predetermined cycle.

The predetermined cycle may be more preferably set based on locations of the electronic apparatus and the plurality of external apparatuses.

In accordance with an aspect of another exemplary embodiment, there is provided a control method of an electronic apparatus having a plurality of operation modes with respect to an access to a server, the method including: generating information used to one function of a user terminal; attempting an access to the server at a first operation mode; in response to determining that the server is in a normal communication state based on the access attempt, providing the generated information to the user terminal via the server; and in response to determining that the server is in a communication pending state based on the access attempt, transmitting a first mode changing signal for operating in a second operation mode, which restricts the access to the server, to at least one of the plurality of external apparatuses.

The method may more preferably further include, in response to the first mode change signal being received from at least one of the plurality of external apparatuses at the first operation mode, determining that the server is in the communication pending state; transmitting the first mode change signal to at least one of the plurality of external apparatuses; and changing an operation mode of the electronic apparatus to the second operation mode.

The method may more preferably further include restricting the information generating operation at the second operation mode.

The method may more preferably further include, in response to a second mode change signal for operating in the first operation mode being received from at least one of the plurality of external apparatuses at the second operation mode, transmitting the second mode change signal to at least one of the plurality of external apparatuses and changing the operation mode of the electronic apparatus to the first operation mode.

The method may more preferably further include periodically attempting the access to the server.

The periodically attempting may more preferably include determining that the server is in the communication pending state in response to a communication acknowledgement being not received from the server while attempting the access to the server more than predetermined critical number of times.

The method may more preferably further include, in response to determining that the server is in the normal communication state based on the periodical access attempts after transmitting the first mode change signal to the at least one of the plurality of external apparatuses, transmitting a second mode change signal for operating in the first mode to the at least one external apparatus to which the first mode change signal is transmitted.

The information used to the one function of the user terminal may more preferably include at least one of surrounding environment information and information on current condition of the electronic apparatus.

The method may more preferably further include, in response to determining that the server is in the communication pending state based the access attempt or operating in the second mode, storing the information used to the one function of the user terminal.

The method may more preferably further include retrieving whether there is any external apparatus capable of storing information from among the plurality of external apparatuses and transmitting the information used to the one function of the user terminal to the retrieved external apparatus.

The method may more preferably further include changing the operation mode of the electronic apparatus based on a predetermined cycle.

According to the exemplary embodiments, if the server does not respond, the electronic apparatus may spreads the signal to other surrounding electronic apparatuses to restrict accesses to the server, thereby enhancing electric power and communication efficiencies.

BRIEF DESCRIPTION OF THE DRAWINGS

FIG. 11 is a flowchart illustrating a process of controlling an electronic apparatuses according to an exemplary embodiment.

DETAILED DESCRIPTION OF EXAMPLE EMBODIMENTS

Figure 1:
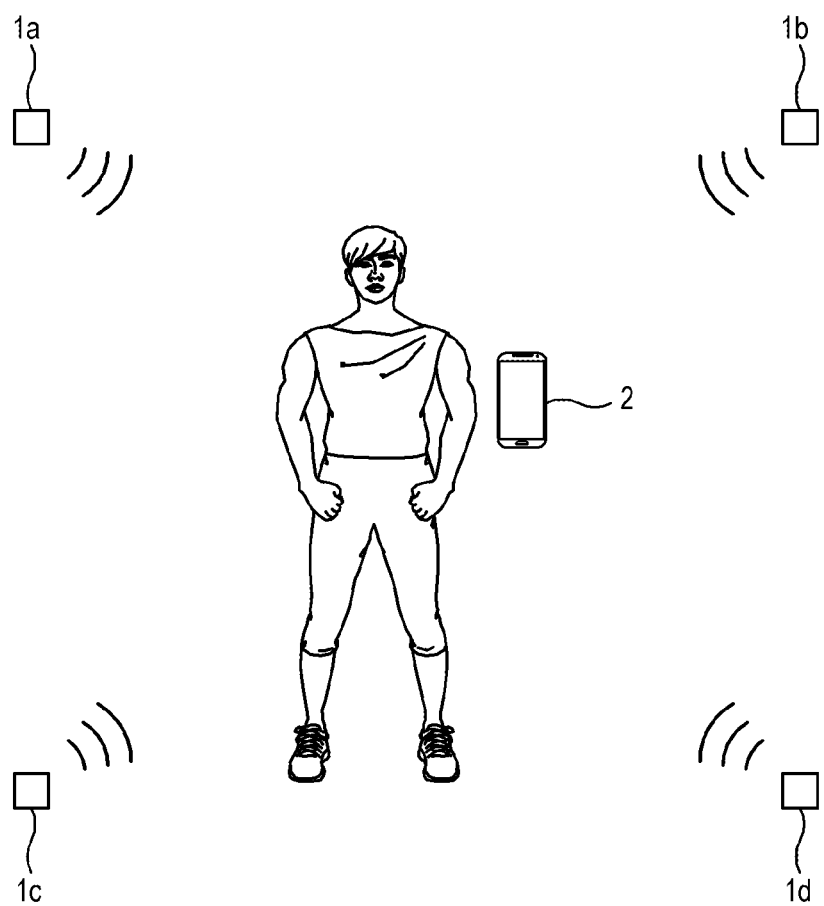
FIG. 1 illustrates an implementation example of an internet of things (IOT) according to an exemplary embodiment.

Below, exemplary embodiments will be described in detail with reference to accompanying drawings. In the following description and accompanying drawings, descriptions of well-known functions and constructions, which can cloud the gist of the present disclosure, may be omitted for clarity and conciseness. Also, it should be noted that like elements are represented by like reference numerals throughout the whole drawings as far as possible.

The terms and words used in the following description and claims should not be interpreted as being limited to the bibliographical meanings, but as meanings and concepts conforming with technical thoughts of the present disclosure, based on the principle that the inventor can properly define the exemplary embodiments in terms for explaining them in the best way. Accordingly, it should be appreciated that various exemplary embodiments described herein and constructions illustrated in accompanying drawings are provided for explanation and illustration purpose only and various changes and modifications can be made to replace the various embodiments described herein at a time as filed.

Some of the elements shown in accompanying drawings have been exaggerated, omitted or briefly illustrated, and the size of each element does not wholly reflect the actual size. The present disclosure is not limited by the relative size or interval shown in accompanying drawings.

If an element is described as "including" another element throughout this specification, it means the former may further include the latter rather than excluding other elements unless otherwise specifically provided herein. The term "portion" used in this specification means software field-programmable gate array (PFGA) or hardware such as application-specific integrated circuit (ASIC), and may be configured to perform certain roles. However, the term "portion" is not limited to the software or hardware, and may be configured to be in an addressable storage medium, or may be configured to reproduce one or more processors. Thus, as an example, the term "portion" includes elements such as software elements, object-oriented software elements, class elements and task elements, and processes, functions, features, procedures, sub-routines, segments of program codes, drivers, firmware, micro codes, circuits, data, database, data configurations, tables, arrays and variables. The functionality provided in the elements and or portions may be coupled to a smaller number of elements and parts or further divided into additional elements and portions.

With reference to accompanying drawings, exemplary embodiments will be described in detail for those skilled in the art to work the present disclosure without difficulty. The exemplary embodiments may be achieved in various forms, and are not limited to the embodiments provided herein. To clearly describe the exemplary embodiments, those unrelated to the description have been omitted, and like reference numerals denote like elements throughout this specification.

Figure 2:
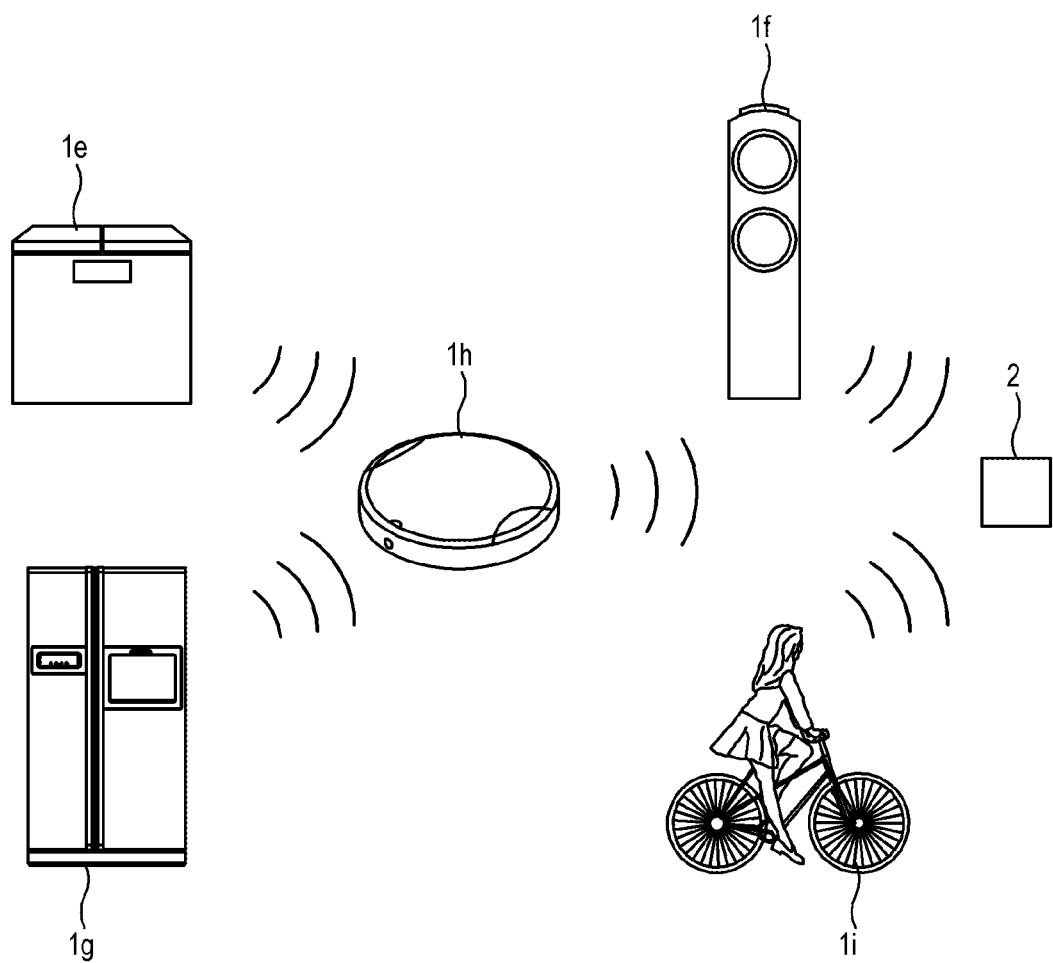
FIG. 2 illustrates another implementation example of the IOT according to an exemplary embodiment.

FIGS. 1 and 2 illustrate an example in which an electronic apparatus is used according to an exemplary embodiment.

As described above, an IOT may be implemented by a plurality of electronic apparatuses 1a to 1i, and a user terminal 2 for providing information for a user or providing a control signal for the plurality of electronic apparatuses 1a to 1i. As illustrated in FIG. 1, the plurality of electronic apparatuses 1a to 1d may be implemented as simple sensors to detect surrounding environments and provide the detected information to the user terminal 2 or other electronic apparatuses. Also, as illustrated in FIG. 2, the plurality of electronic apparatuses 1e to 1i may be implemented as electronic apparatuses for performing various functions, which include a sensor to provide information for the user, respectively and/or which provide a function based on a control signal received according to a manipulation for the user terminal 2, respectively.

The electronic apparatuses 1a to 1i according to the present disclosure are not limited to the drawings and the descriptions as described above, and may be implemented as various exemplary embodiments in which the electronic apparatuses 1a to 1i are configured to realize the IOT. The electronic apparatuses 1a to 1i may be implemented as sensors to detect surrounding environments, such as a temperature, a humidity, a motion, a material of floor, a weather, and the like, or apparatuses, such as a refrigerator 1g, a cleaner 1h, an air conditioner 1f, a kimchi refrigerator 1e, an exercise equipment 1i, and so on, which include the sensors and provide various functions for the user, respectively.

For example, a plurality of sensors 1a to 1d may check a dust state of floor and a temperature and the like on in the home, and inform the user of related information. Otherwise, a refrigerator 1g may inform the user that any milk has passed its expiration date, a kimchi refrigerator 1e may provide information on potential of hydrogen (pH) of preserved kimchi, and if the user uses an exercise equipment 1i, the exercise equipment 1i may provide information on whether how many hours the user has exercised and how many calories the user has burned, for the user via the user terminal 2.

With reference to the information provided via the user terminal 2, the user may give a command to the vacuum cleaner 1h to clean the dirtiest place, and control the air conditioner 1f to operate in a cooling mode if a temperature in the home is high. Otherwise, the user may buy new milks to preserve in the refrigerator 1g, and send out an order for adjusting the pH of the preserved kimchi to the kimchi refrigerator 1e.

In other words, the user may receive all kinds of information from the various electronic apparatuses 1a to 1i via the user terminal 2, and may control to efficiently operate the electronic apparatuses 1a to 1i using the received information. The control of the electronic apparatuses 1a to 1i may be carried out via the user terminal 2 and/or by a user's direct manipulation for the electronic apparatuses 1a to 1i.

Figure 3:
FIG. 3 illustrates an example of information generated and provided by electronic apparatuses, according to an exemplary embodiment.

FIG. 3 illustrates an example of information generated and provided by the electronic apparatuses, according to an exemplary embodiment.

The plurality of electronic apparatuses 1a to 1i may be implemented as sensors or include the sensors to detect surrounding environment information, and transmit information 300 including conditions of the electronic apparatuses 1a to 1i to an external, respectively. FIG. 3 illustrates an example in which the information 300 is generated by the plurality of electronic apparatuses 1a to 1i to be delivered to the user via the user terminal 2. The information 300 may include a list 301 of the plurality of electronic apparatuses 1a to 1i, and items 303 including surrounding environments provided by the respective electronic apparatuses 1a to 1i and conditions of the respective electronic apparatuses 1a to 1i.

The user may receive the information 300 via the user terminal 2, and control the respective electronic apparatuses 1a to 1i directly or remotely via the user terminal 2, based on the received information 300.

The drawing and the descriptions as described above are merely illustrations, and the information provided for the user when realizing the IOT may include more various types of information.

Figure 4:
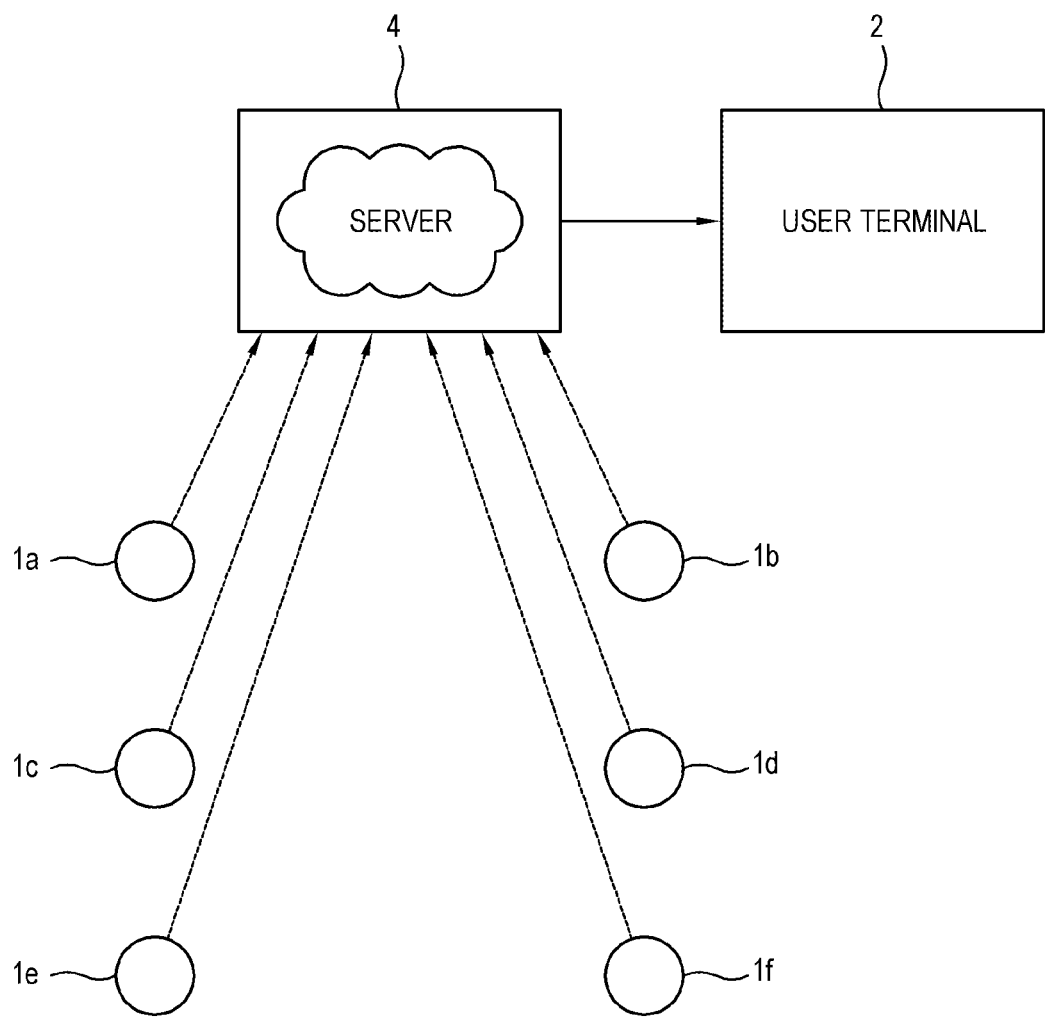
FIG. 4 illustrates an example of operating a plurality of electronic apparatuses and a server, according to an exemplary embodiment.

FIG. 4 illustrates an example of operating a plurality of electronic apparatuses and a server, according to an exemplary embodiment.

As described above, the plurality of electronic apparatuses 1a to 1f may be configured to provide information generated thereby to the user terminal 2, respectively. The transmission of the information may be carried out via a direct communication with the user terminal 2, but the present exemplary embodiment will be explained as transmitting the generated information to a server 4 via the network, so that the user terminal 2 in turn receives the information from the server 4.

To transmit the information to the server 4, the plurality of electronic apparatuses 1a to 1f may configured to attempt accesses to the server 4, and if receiving acknowledgements from the server 4, to transmit the generated information to the server 4, respectively.

Figure 5:
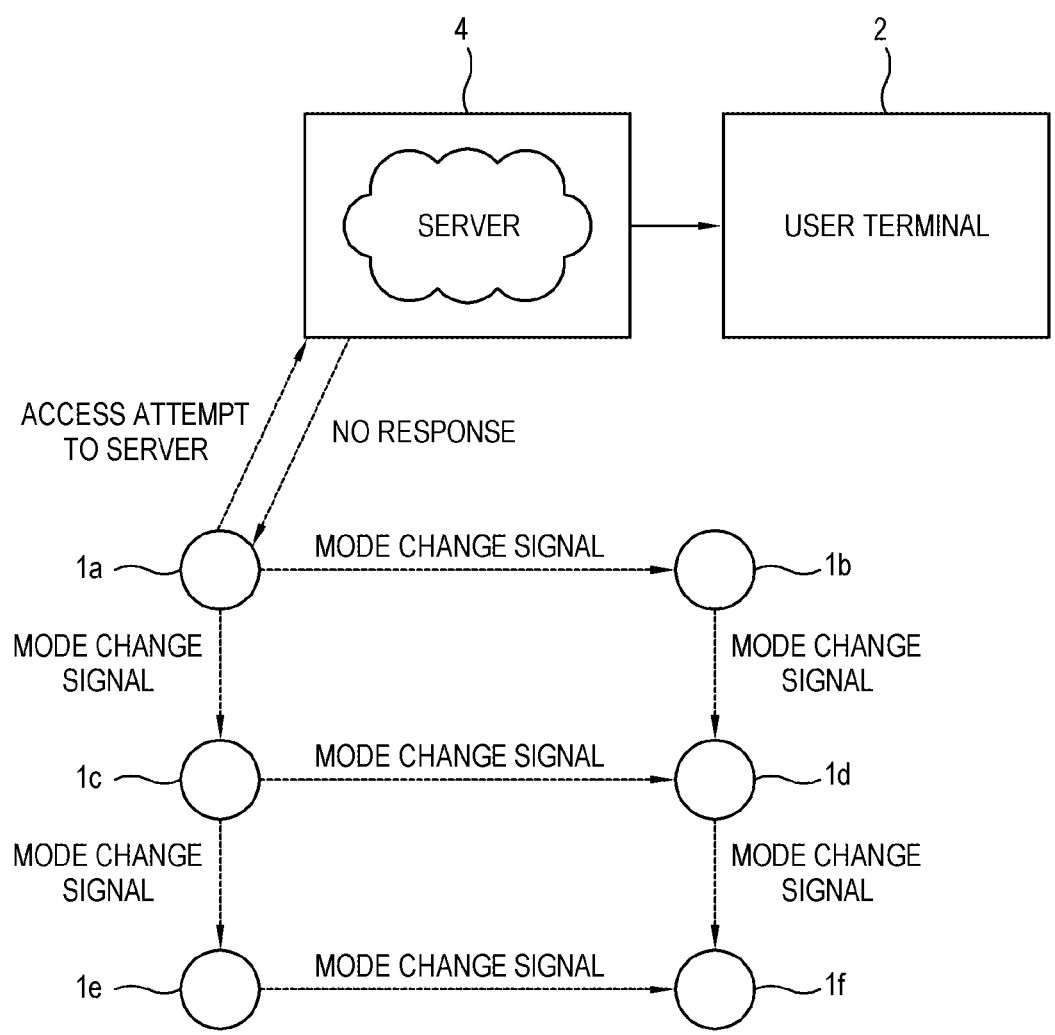
FIG. 5 illustrates another example of operating the plurality of electronic apparatuses and the server, according to an exemplary embodiment.

FIG. 5 illustrates another example of operating the plurality of electronic apparatuses and the server, according to an exemplary embodiment.

To transmit the information to the server, the plurality of electronic apparatuses 1a to 1f may attempt accesses to the server 4, respectively. However, if the server 4 is in a state where it is unable to communicate due to errors, communication congestion, or the like, it may fail to respond to the accesses of the electronic apparatuses 1a to 1f. What all the electronic apparatuses 1a to 1f attempt the accesses to the server 4 when the server 4 is in the communication pending or uncommunicable state as described above may cause a waste of electric power and an unnecessary communication channel contention.

To address these problems, each of the electronic apparatuses 1a to 1f according to an exemplary embodiment may be configured to have a plurality of operation modes with respect to an access to the server 4. At a first operation mode, the electronic apparatuses 1a to 1f may periodically attempt the accesses to the server 4 and at a second operation mode, operate, so that attempting the access to the server 4 is restricted to some extent.

In the present exemplary embodiment, if one electronic apparatuses 1a of the plurality of electronic apparatuses 1a to 1f fails to receive an acknowledgement from the server 4 while attempting accesses to the server 4 more than predetermined number of times at the first operation mode, it may determine that the server 4 is in the communication pending state and transmit a first mode change signal to connected other electronic apparatuses 1b to 1f to restrict accesses to the server 4. The transmission of the first mode change signal includes a peer to peer (P2P) transmission or a broadcasting. The other electronic apparatuses 1b to 1f by which the first mode change signal is received may change an operation mode to the second operation mode and may be controlled, so that accesses thereof to the server 4 are restricted until a second mode change signal is received. The restriction of the accesses means that the number of times of attempting the access is reduced by a given frequency as compared with that at the first operation mode.

Accordingly, the other electronic apparatuses 1b to 1f may be configured not to attempt the accesses to the server 4 at all or to attempt the accesses a lot fewer number of times as compared with that for the same time at the first operation mode, while operating in the second operation mode.

As the access to the server 4 is restricted for the other electronic apparatuses 1b to 1f, which operate at the second operation mode, there are effects in that the consumption of electric power consumed to the access is reduced and the channel contention is moderated.

Figure 6:
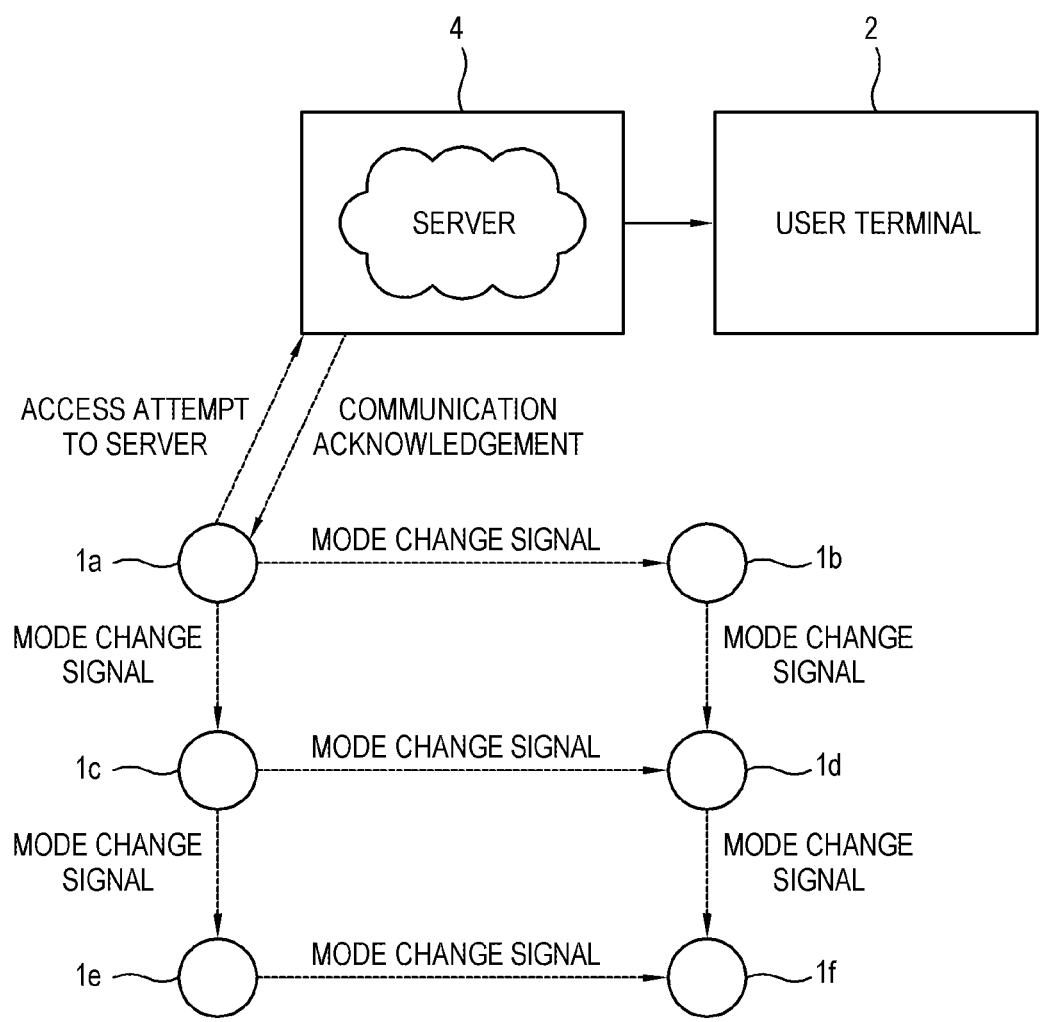
FIG. 6 illustrates other example of operating the plurality of electronic apparatuses and the server, according to an exemplary embodiment.

FIG. 6 illustrates other example of operating the plurality of electronic apparatuses and the server, according to an exemplary embodiment.

The one electronic apparatus 1a which has transmitted the first mode change signal to the other electronic apparatuses 1b to 1f may be operated as a representative electronic apparatus to periodically attempt the access to the server 4. While the other electronic apparatuses 1b to 1f is operated in the second operation mode, so that the accesses thereof to the server 4 are restricted, the representative electronic apparatus 1a may be operated in the first operation mode to periodically attempt the access to the server 4, thereby monitoring whether the communication pending or uncommunicable state of the server 4 is removed or lifted.

After the communication pending state of the server 4 is removed, so that the server 4 can normally communicate, i.e., the server 4 comes to be in a communication standby state, if the representative electronic apparatus 1a attempts an access to the server 4 again to communicate therewith, the server 4 may transmit an acknowledgement to the representative electronic apparatus 1a, and thus the representative electronic apparatus 1a may transmit a second mode change signal for operating in the first operation mode, to the connected other electronic apparatus 1b to 1f.

The other electronic apparatus 1b to 1f by which the second mode change signal is received change the operation mode to the first operation mode, and as the access restriction is removed, may transmit generated information to the user terminal 2 via the server 4.

Figure 7:
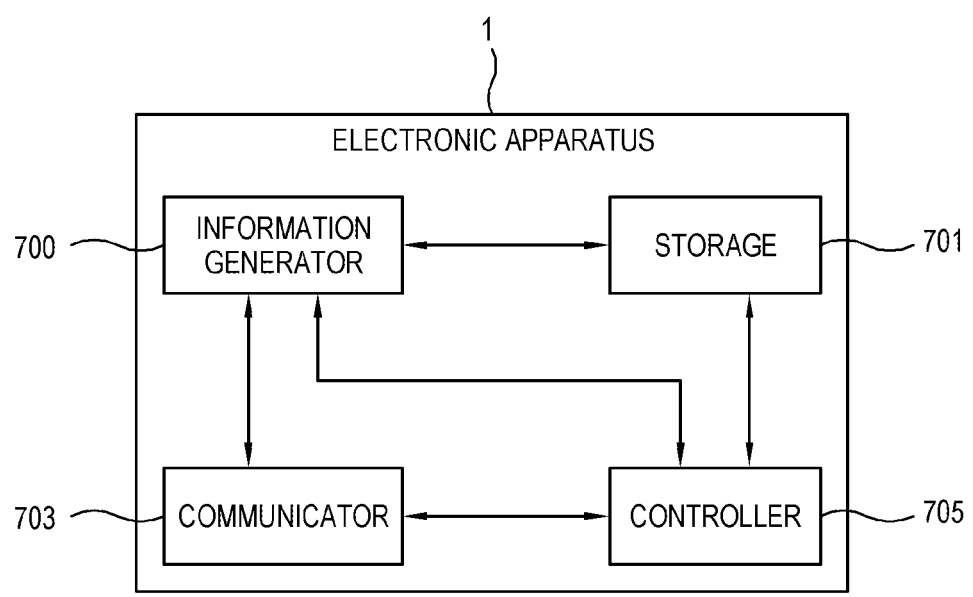
FIG. 7 is a block diagram of an electronic apparatus according to an exemplary embodiment.

FIG. 7 is a block diagram of an electronic apparatus according to an exemplary embodiment.

The electronic apparatus 1 may be configured to detect surrounding environments or to generate information on condition or state of the electronic apparatus 1 and so on and to transmit the generated information to the user terminal 2 via the server 4.

To this end, the electronic apparatus 1 may include an information generator 700, a storage 701, a communicator 703 and a controller 705.

The information generator 700 may be configured to generate information used to functions of the user terminal 2. The information may include surrounding environment information and information on operation condition of the electronic apparatus 1.

The information generator 700 may further include a sensor part for detecting surrounding environments to generate the surrounding environment information. The sensor part may detect surrounding environments, such as a temperature, a weather, a movement, a humidity, etc., and generate surrounding environment information based on the detected values.

The information generator 700 may store information on present condition of the electronic apparatus 1. The present condition may include contents on a mode where the electronic apparatus 1 is operating, an operation time, a consumed electric power, the number of preserved articles, the kind of articles, etc.

The storage 701 may be configured to store the information generated by the information generator 700. To be more specific, if it is determined that the server 4 is in the communication pending state or the electronic apparatus 1 operates in the second operation mode, the electronic apparatus 1 cannot transmit the generated information. Accordingly, the electronic apparatus 1 may store the generated information in the storage 701 first.

The storage 701 may be provided with a non-volatile memory (writable ROM), which retains data regardless of whether the electronic apparatus 1 is turned on or off and which is writable to reflect changes. In other words, the storage may be provided with any one of a flash memory, an EPROM and an EEPROM. The surrounding environments may include time zones, changes in surrounding illumination intensity, changes in surrounding weather, etc. The storage 701 may further store information on conditions of a plurality external electronic apparatuses 1 before they is changed when the operation mode begins.

The communicator 703 may be provided to allow the electronic apparatus 1 to communicate directly or via the network or the like with the server 4, the user terminal 2 and the plurality of other external electronic apparatuses 1. The communicator 703 may be provided with a plurality of connection ports according to various standards, such as high definition multimedia interface (HDMI), universal serial bus (USB) and the like. The communicator 703 may communicate by wire with a plurality of servers via wired local area network (LAN). The communication, which is carried out by the communicator 703, may include a wireless communication. In this case, the communicator 703 may include a radio frequency (RF) circuit for transmitting and receiving a RF signal. The communicator 703 may perform the wireless communication via a wireless network in methods, such as wireless fidelity (Wi-Fi), wireless LAN and the like. Otherwise, the communicator 703 may also perform the wireless communication with the external apparatuses or the network in methods, such as Bluetooth and the like. Moreover, the communicator 703 may further perform communications for internet telephony services, messaging services and the like.

The communicator 703 according to an exemplary embodiment may be configured to operate differently according to the operation modes of the electronic apparatus 1. To be more specific, the electronic apparatus is configured to operate in a plurality of operation modes, for example, a first operation mode and a second operation mode, with respect to the access to the server 4. The first operation mode means an operation mode where the access to the server 4 is not restricted, and the second operation mode means an operation mode where the access to the server 4 is restricted. The electronic apparatus 1 may include many kinds of operation modes for providing various functions, but the first operation mode and the second operation mode described herein mean operation modes, which are related with the access to the sever 4.

In other words, the communicator 703 may configured to periodically attempt the access to the server while the electronic apparatus 1 is operated in the first operation mode, and not to attempt the access to the server 4 at all or to attempt the access a lot fewer number of times as compared with that in the first operation mode, while the electronic apparatus 1 is operated in the second operation mode.

The communicator 703 may communicate with the other electronic apparatuses 1 even while the electronic apparatus 1 is operated in the second operation mode, and if necessary, transmit to the other electronic apparatuses 1, information required to perform functions of the user terminal 2 and generated by the information generator 700. Explanations on this will be described later.

The controller 705 is configured to control general operation of the electronic apparatus 1 according to an exemplary embodiment. To be more specific, the controller 705 may control the communicator 703 to periodically attempt an access to the server 4 while the electronic apparatus 1 is operated in the first operation mode, and if receiving a communication acknowledgement from the server 4, to transmit the generated information to the server 4. However, if the server 4 is in a communication pending or uncommunicable state and thus fails to transmit the communication acknowledgement to the electronic apparatus 1, the controller 705 may control the communicator 703 to transmit a mode change signal to connected other electronic apparatuses 1. The electronic apparatus 1, which has grasped first the communication pending or uncommunicable state of the server 4, may transmit the mode change signal to the other electronic apparatuses 1 and then operate as a representative electronic apparatus. At this time, the electronic apparatus 1 (hereinafter, also referred to a 'representative electronic apparatus') as the representative electronic apparatus may periodically attempt the access to the server 4 without changing the operation mode into the second operation mode and monitor whether the server 4 is able to normally perform the communications again, i.e., the server 4 is in a communication standby state.

According to another exemplary embodiment, the representative electronic apparatus 1 may be the geographically nearest electronic apparatus to the server 4. The representative electronic apparatus 1 may attempt the access to the server 4 a lot more number of times than the other electronic apparatuses 1 and if the server 4 comes to the communication pending state, transmit a mode change signal to the other electronic apparatuses 1. The representative electronic apparatus 1 may be configured to transmit the mode change signal to the other electronic apparatuses 1 if a communication acknowledgement is not received from the server 4, which responds to the access, or a mode change request is received from the server 4. Even if the electronic apparatus 1 continues to attempt the access to the server 4 and the server 4 is in a normal communicable state, the server 4 may request for a mode change to allow to the electronic apparatuses 1 to still operate and maintain in the second operation mode. As such a mode change request is received from the server 4, the representative electronic apparatus 1, which is geographically close to the server 4, may provide the mode change signal to the other electronic apparatuses 1. In this case, the representative electronic apparatus 1 may be also operated in the second operation mode, so that the access thereof to the server 4 is restricted. The server 4 may request for a mode change to allow the plurality of electronic apparatuses 1, which are operating in the second operation mode, to operate in the first operation mode again.

According to another exemplary embodiment, the plurality of electronic apparatuses 1 may be configured being installed in a wide area, for example, such as a farm, a vinyl greenhouse or the like, to provide information. At this time, if all of the plurality of electronic apparatuses 1 is always operated, the electric power may be wasted. Accordingly, the electronic apparatuses 1 may be configured to selectively change the operation modes based on a predetermined schedule. In the present exemplary embodiment, the electronic apparatuses 1 may be configured to normally operate during the first operation mode and to operate in a sleep mode, which uses minimum electric power, during the second operation mode.

If the server 4 comes to a normal communication state, i.e., a communication standby state again and then the representative electronic apparatus 1 attempts an access to the server 4, the server 4 transmits an communication acknowledgement to the representative electronic apparatus 1. The communicator 703 may be configured to transmit a mode change signal for changing the operation mode from the second operation mode to the first operation mode to the other electronic apparatus 1, if the communication acknowledgement is received.

If a mode change signal is received from at least one of the other electronic apparatuses 1 via the communicator 703, the controller 705 may control the communicator 703 to transmit the mode change signal to at least one other electronic apparatus 1 except the electronic apparatus 1, which provides the mode change signal. At this time, the controller 705 may control to operate the electronic apparatus 1 in the second operation mode. In other words, different from the case confirming that the server 2 is in the communication pending state by attempting the access to the server 4, if the mode change signal is received from the other electronic apparatuses 1, the electronic apparatus 1 by which the mode change signal is received changes the operation mode to the second operation mode and transmits the mode change signal to the at least one other electronic apparatuses 1 except the electronic apparatus 1, which provides the mode change signal, thereby continuing to spread the mode change signal to the other electronic apparatuses 1.

While the electronic apparatus 1 is operated in the second operation mode, the controller 705 may restrict the communicator 703 from attempting the access to the server 4. While the electronic apparatus 1 is operated in the second operation mode, the communicator 703 may be restricted to attempt the access a lot fewer number of times as compared with that for the same time in the first operation mode or not to attempt the access to the server 4 until the operation mode is changed to the first operation mode.

According to another exemplary embodiment, the controller 705 may store information generated by the information generator 700 in the storage, if the server 4 is in the communication pending or uncommunicable state or the electronic apparatus 1 is operated in the second operation mode, so that the electronic apparatus 1 fails to transmit the generated information to the server 4. In other words, if the generated information cannot be transmitted to the server 4, as the next best thing, the controller 705 stores the generated information in the storage 701 and then if the electronic apparatus 1 begins communication with the server 4 again, controls the communicator 703 to transmit the stored information to the server 4. If there is not enough memory to store the information in the storage 701 any longer, the controller 705 may be configured to retrieve whether there is any electronic apparatus 1 capable of storing information using the communicator 703. If there is any electronic apparatus 1 capable of storing the information, the controller 705 may control to transmit the information generated by the information generator 700 via the communicator 703. At this time, the information may be transmitted in priority order.

According to another exemplary embodiment, if the server 4 is in the communication pending or uncommunicable state or the electronic apparatus 1 is operated in the second operation mode, the access to the server 4 may be not only restricted, but also the electronic apparatus 1 may be operated in the sleep mode where the operation thereof is restricted to the hilt, as described above. To be more specific, if the information generated by the information generator 700 includes, for example, a temperature, a humidity and the like of current surroundings, they are worth little if being not transmitted in real time. Thus, if it is a situation where the electronic apparatus 1 cannot transmit the information in real time, there is no need for the electronic apparatus 1 to generate or store the information. Accordingly, to efficiently use electric power when the server 4 is in the communication pending or uncommunicable state or the electronic apparatus 1 is operated in the second operation mode, the access to the server 4 may be not only restricted, but also the information generator 700 and other elements of the electronic apparatus 1 may be deactivated.

Figure 8:
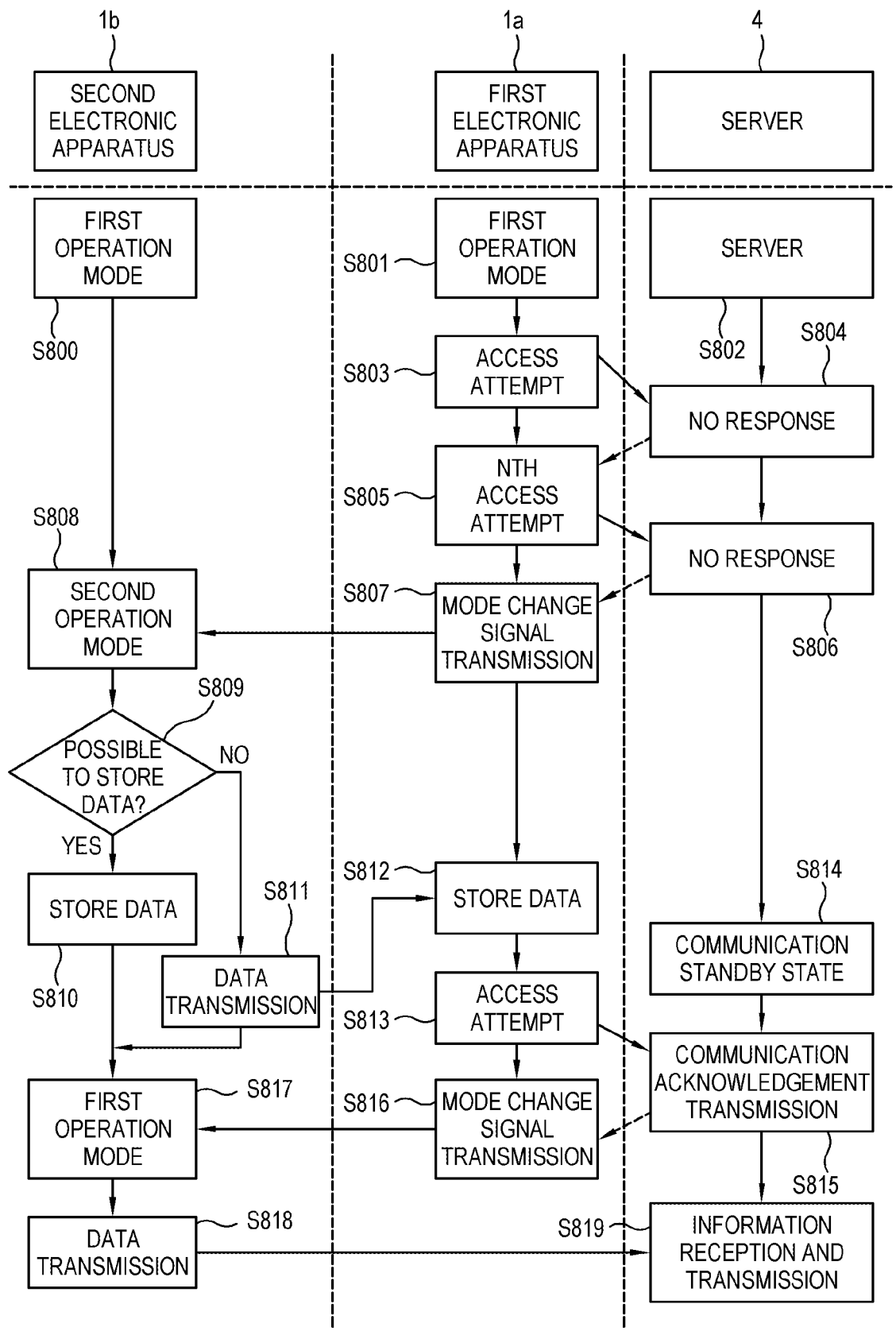
FIG. 8 is a flowchart illustrating a process of operating the plurality of electronic apparatuses and the server, according to an exemplary embodiment.

FIG. 8 is a flowchart illustrating a process of operating the plurality of electronic apparatuses and the server, according to an exemplary embodiment.

The first electronic apparatus 1*a* and the second electronic apparatus 1*b* are operating in a first operation mode (S800 and S801). Also, the server 4 is in a communication pending or uncommunicable state (S802). If the first electronic apparatus 1*a* attempts an access to the server 4 to communicate with the server 4 (S803), the first electronic apparatus 1*a* fails to receive a response from the server 4 because the server 4 is in the uncommunicable state, so that it cannot transmit a communication acknowledgement (S804). The first electronic apparatus 1*a* periodically attempts the access to the server 4 and if there is no response from the server 4 (S806) even until the first electronic apparatus 1*a* attempts the access of N-th times, which is a predetermined critical number of times (S805), transmits a mode change signal to the connected second electronic apparatus 1*b* to change an operation mode of the second electronic apparatus 1*b* to a second operation mode (S807).

The second electronic apparatus 1*b* changes the operation mode to the second operation mode based the mode change signal (S808). Since while the second electronic apparatus 1*b* is operated in the second operation mode, the access of the second electronic apparatus 1*b* to the server 4 is restricted, the second electronic apparatus 1*b* cannot transmit information generated by the information generator 700 to the server 4. According to this, the second electronic apparatus 1*b* determines whether it is able to store the generated information in the storage 701 (S809). If the second electronic apparatus 1*b* is able to store the generated information, the second electronic apparatus 1*b* stores the generated information in the storage 701 (S810). If the second electronic apparatus 1*b* is unable to store the generated information, the second electronic apparatus 1*b* retrieves whether there is any electronic apparatus capable of storing the information. For this, the second electronic apparatus 1*b* may transmit a request to connected other electronic apparatuses 1*a* and 1*c* to 1*f* via the communicator 703, and if an acknowledgement or a decline is received, for example, from the electronic apparatuses 1*a* to which the request is transmitted, complete the retrieval. In the exemplary embodiment, it is assumed that the first electronic apparatus 1*a* is able to store the information. The second electronic apparatus 1*b* transmits the generated information to the first electronic apparatuses 1*a* capable of storing the information (S811), and the first electronic apparatus stores the received information (S812).

If the server 4 is changed to a normal communication state, i.e., a communication standby state (S814) and the first electronic apparatus 1*a* attempts an access to the server 4 again (S813), the server 4 transmits a communication acknowledgement (S815). As the communication acknowledgement is received, the first electronic apparatus 1*a* transmits a mode change signal to the second electronic apparatus 1*b* to change the operation mode of the second electronic apparatus 1*b* to the first operation mode (S816). The second electronic apparatus 1*b* receives the mode change signal from the first electronic apparatus 1a and changes the operation mode to the first operation mode (S817). The second electronic apparatus 1b attempts an access to the server 4 at the first operation mode and if a communication acknowledgement is received, transmits generated information to the server (S818). The server 4 receives the information from the second electronic apparatus 1b and transmits the received information to the user terminal 2 (S819).

Although in the exemplary embodiment, only the operations of the first and the second electronic apparatuses 1a and 1b of the plurality of electronic apparatuses 1a to 1f and the server 4 have been explained based on the flowchart of the drawing, it should be apparent to those skilled in the art that the plurality of electronic apparatuses for achieving the IoT system according to the present disclosure is limited to two in number or those explanations are not provided for the purpose of limiting the operation of the IoT system.

Figure 9:
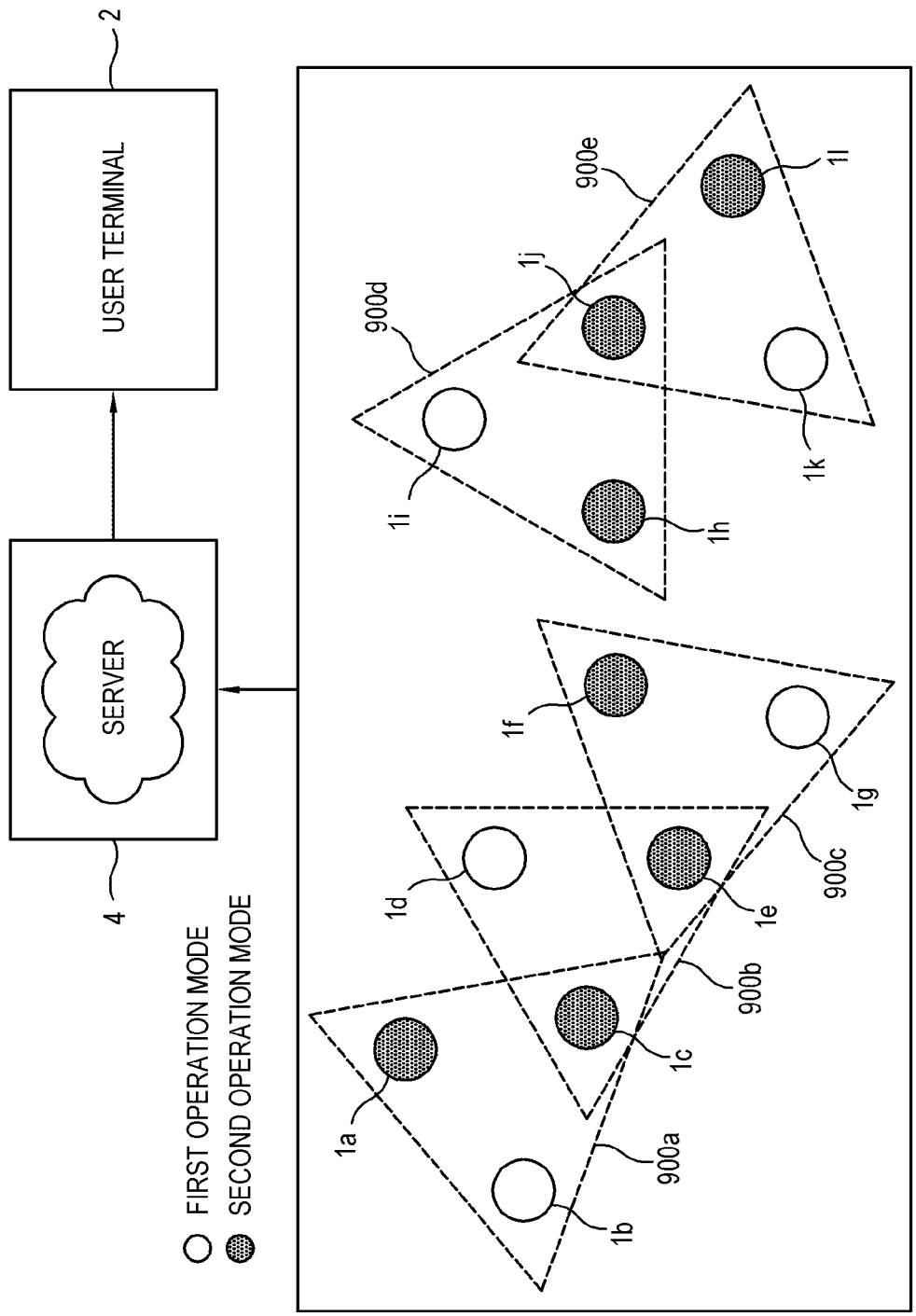
FIG. 9 illustrates an example of operating a plurality of electronic apparatuses according to an exemplary embodiment.

FIG. 9 illustrates an example of operating a plurality of electronic apparatuses according to an exemplary embodiment.

As described above, the plurality of electronic apparatuses 1a to 1l is provided on portions of the site having a wide area, such as a farm, a vinyl greenhouse or the like, to detect surrounding environments, such as a temperature, a humidity, a wind direction, etc., or to perform various functions, such as water supply and the like. However, what all of the plurality of electronic apparatuses 1a to 1l is always operated may cause a waste of electric power. For example, if distances among the electronic apparatuses 1a to 1l are in the range of 10 m, continuously detecting the temperature or weather with all of the plurality of electronic apparatuses 1a to 1l merely produces the same results and thus may be meaningless. Accordingly, the IoT system according to an exemplary embodiment may be configured, so that the plurality of electronic apparatuses 1a to 1l are divided into a plurality of groups 900a to 900e, each having at least one electronic apparatus, and more than at least one electronic apparatus is operated based on a schedule in the plurality of groups 900a to 900e.

For example, the electronic apparatuses 1a to 1l may be operated rotating according to the schedule in such a manner that at least one electronic apparatus in each of the groups 900a to 900e is operated and each of the electronic apparatuses 1a to 1l is not continuously operated for more than one hour.

Referring to the drawing, each of the groups 900a to 900e are set by region, and at least one electronic apparatus in each of the groups 900a to 900e is in operation. The electronic apparatuses 1a to 1l may be operated in the first operation mode or the second operation mode based on the schedule stored in the storage 701, regardless of whether the server 4 is in the communicable state. In the present exemplary embodiment, the second operation mode may restrict only an access to the server 4, but in another exemplary embodiment, may include an operation, which minimizes power consumption.

Figure 10:
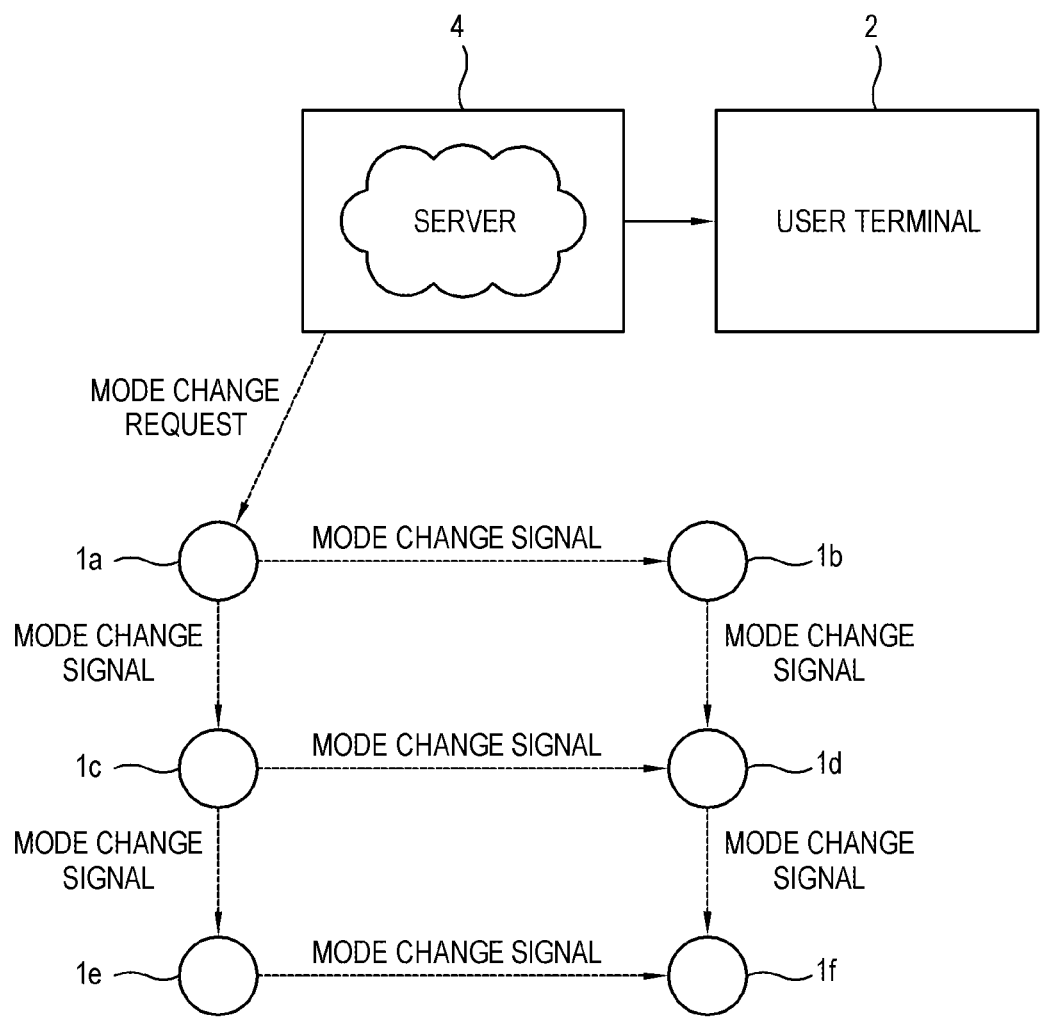
FIG. 10 illustrates an example of operating a plurality of electronic apparatuses and a server according to another exemplary embodiment.

FIG. 10 illustrates an example of operating the plurality of electronic apparatuses and the server according to another exemplary embodiment.

In the present exemplary embodiment, the server 4 may directly request a representative electronic apparatus 1a for a mode change, to restrict accesses of the plurality of connected electronic apparatuses 1a to 1f, as well as when the server 4 is in the communication pending or uncommunicable state. The representative electronic apparatus 1a may be an electronic apparatus, which is proximate to the server 4 or which has last attempted an access to the server 4.

The representative electronic apparatus 1a, which receives the mode change request, transmits a mode change signal to connected other electronic apparatuses 1b to 1f to operate in the second operation mode. As the mode change signal is transmitted to the other electronic apparatuses 1b to 1f, all the electronic apparatuses 1a to 1f, which can communicate with the server 4, come to operate in the second operation mode. In the present exemplary embodiment, since the server 4 directly request for the mode change, the representative electronic apparatus 1a also operates in the second operation mode, so that the access thereof to the server 4 is restricted.

While the access of the electronic apparatuses 1a to 1f to the server 4 is restricted, generated information is stored in the storage 701, or if the information cannot be stored in the storage 701 any longer, may be transmitted to any retrieved electronic apparatus (1 in FIG. 7), which can store the information.

Also, if, to communicate with the plurality of electronic apparatuses 1a to 1f again, the server 4 requests the representative electronic apparatus 1a for a mode change, the representative electronic apparatus 1a, which receives the mode change request, transmits a mode change signal to connected other electronic apparatuses 1b to 1f to operate in the first operation mode, like the preceding. The electronic apparatuses 1a to 1f in which the operation mode is changed to the first operation mode attempt accesses to the server 4 and transmit generated information to the server 4, respectively.

FIG. 11 is a flowchart illustrating a process of operating an electronic apparatuses according to an exemplary embodiment.

First, at an operation S1300, the information generator 700 generates information used to one function of the user terminal 2. The communicator 703 performs communications with the user terminal 2, the server 4, and the plurality of external electronic apparatuses 1. At an operation S1301, if the electronic apparatus 1 is in a first operation mode, the communicator 703 attempts an access to the server 4. At an operation S1302, the controller 705 determines whether in response to the access, a communication acknowledgement is received from the server 4. If the communication acknowledgement is received from the server 4, the controller 705 determines that the server 4 is in a normal communication state, and at an operation S1303, transmits information, which is generated by the information generator 700 to be used to one function of the user terminal 2, to the user terminal 2 via the server 4. If the acknowledgement of communication is not received from the server 4, at an operation S1304, the controller 705 determines that the server 4 is in a communication pending state, and then controls the communicator 703 to transmit a mode change signal to at least one of the plurality of external electronic apparatuses 1 to operate in a second operation mode.

The electronic apparatus 1, which since the communication acknowledgement is not received from the server 4, has determined that the server 4 is in the communication pending state and transmitted the mode change signal to at least one external electronic apparatus 1, is operated as a representative electronic apparatus, and may not change the operation mode to the second operation mode, but periodically attempt an access to the server 4 to monitor whether the server 4 normally performs the communications, i.e., the server 4 is changed into a communication standby state.

The at least one external electronic apparatus 1, which has received the mode change signal to operate in the second operation mode, may change the operation mode to the second operation mode and spread the received mode change signal to connected at least one other external electronic apparatus 1 except the electronic apparatus 1, which has transmitted the mode change signal thereto, to operate in the second operation mode.

If while operating in the second operation mode, one electronic apparatus 1 receives a mode change signal to operate in the first operation mode from another electronic apparatus 1, the one electronic apparatus 1 may change the operation mode to the first operation mode and spread the received mode change signal to connected at least one other electronic apparatus 1 except the another electronic apparatus 1, which has transmitted the mode change signal thereto, to operate in the first operation mode.

According to another exemplary embodiment, the electronic apparatuses 1 may receive a mode change request from the server 4. To restrict accesses from the plurality of the electronic apparatuses 1, the server 4 may select one of the plurality of the electronic apparatuses 1 as a representative electronic apparatus and transmit the mode change request to the selected electronic apparatus 1 to operate in the second operation mode. If the mode change request is received from the server 4, the electronic apparatus 1 may transmit a mode change signal to connected other electronic apparatuses 1. As above, when the server 4 directly request for the mode change, the electronic apparatus 1 selected as the representative electronic apparatus may be configured to change the operation mode into the second operation mode, like the other electronic apparatuses 1.

The representative electronic apparatus 1 may be selected based on various standards, such as geographical elements, access attempting number and the like, from among the plurality of the electronic apparatuses 1.

To permit the accesses from the electronic apparatuses 1, the server 4 may transmit a mode change request to the representative electronic apparatus 1 to operate in the first operation mode. The representative electronic apparatus 1 may be a predetermined or newly selected electronic apparatus from the plurality of electronic apparatuses 1. After receiving the mode change request, the representative electronic apparatus 1 may transmit a mode change signal to connected at least one other electronic apparatus 1 to operate in the first operation mode. The plurality of the electronic apparatuses 1 including the representative electronic apparatus 1 may change the operation mode into the first operation mode and then communicate with the server 4 to transmit generated information.

We claim:

1. An electronic apparatus operable in at least one of a first operation mode or a second operation mode with respect to accessing a server, the electronic apparatus comprising:
   a communication interface unit (CIU) configured to communicate with the server and a plurality of external electronic apparatuses, the plurality of external electronic apparatuses each being operable in the at least one of the first operation mode or the second operation mode with respect to accessing the server; and
   a processor configured to:
   control the CIU to attempt access to the server at a first time when the electronic apparatus operates in the first operation mode;
   based on identifying that the server is in a normal communication state based on the access attempt, provide information generated by the electronic apparatus to a user terminal via the server; and
   based on identifying that the server is in a communication pending state based on the access attempt, transmit a first mode change signal for changing from the first operation mode to the second operation mode in which access attempts to the server are restricted, to at least one first external electronic apparatus of the plurality of external electronic apparatuses.

2. The electronic apparatus according to claim 1, wherein the processor is configured to, based on receiving, via the CIU, at a second time when the electronic apparatus operates in the first operation mode, the first mode change signal transmitted from at least one second external electronic apparatus of the plurality of external electronic apparatuses, identify that the server is in the communication pending state based on the received first mode change signal, control the CIU to transmit the first mode change signal to at least one third external electronic apparatus of the plurality of external apparatuses, and change from the first operation mode to the second operation mode of the electronic apparatus.

3. The electronic apparatus according to claim 2, wherein the processor is configured to restrict generating of the information when the electronic apparatus operates in the second operation mode.

4. The electronic apparatus according to claim 2, wherein the processor is configured to, based on a second mode change signal for changing from the second operation mode to the first operation mode being received from the at least one second external electronic apparatus via the CIU when the electronic apparatus operates in the second operation mode, control the CIU to transmit the second mode change signal to the at least one third external electronic apparatus, and change from the second operation mode to the first operation mode of the electronic apparatus.

5. The electronic apparatus according to claim 1, wherein the processor is configured to control the CIU to periodically attempt the access to the server when the electronic apparatus operates in the first operation mode.

6. The electronic apparatus according to claim 5, wherein the processor is configured to identify that the server is in the communication pending state based on a communication acknowledgement not being received from the server while attempting access to the server more than a predetermined number of times.

7. The electronic apparatus according to claim 5, wherein the processor is configured to, based on identifying that the server is in the normal communication state based on the periodic access attempt, control the CIU to transmit a second mode change signal for changing from the second operation mode to the first operation mode to the at least one first external electronic apparatus.

8. The electronic apparatus according to claim 1, wherein the generated information comprises at least one of surrounding environment information or information on current condition of the electronic apparatus.

9. The electronic apparatus according to claim 1, further comprising:
   a nonvolatile, non-transitory storage,
   wherein the processor is configured to, based on identifying that the server is in the communication pending state or that the electronic apparatus is operating in the second operation mode, store in the nonvolatile, non-transitory storage, the generated information.

10. The electronic apparatus according to claim 9, wherein the processor is configured to:
- control the CIU to identify, from among the plurality of external electronic apparatuses, any external electronic apparatus capable of storing the generated information; and
- control the CIU to transmit the generated information to the identified external electronic apparatus.

11. The electronic apparatus according to claim 1, wherein the processor is configured to control the electronic apparatus to change mode of the electronic apparatus based on a cycle.

12. The electronic apparatus according to claim 11, wherein the cycle is set based on respective locations of the electronic apparatus and the plurality of external electronic apparatuses.

13. The electronic apparatus according to claim 1, further comprising:
- a sensor configured to generate the information.

14. A control method of an electronic apparatus operable in at least one of a first operation mode or a second operation mode with respect to accessing a server, the method comprising:
- generating information for use by a user terminal;
- attempting, when the electronic apparatus operates in the first operation mode, an access to the server;
- based on identifying that the server is in a normal communication state based on the access attempt, providing the generated information to the user terminal via the server; and
- based on identifying that the server is in a communication pending state based on the access attempt, transmitting a first mode change signal for changing from the first operation mode to the second operation mode in which access attempts to the server are restricted, to at least one first external electronic apparatus of a plurality of external electronic apparatuses.

15. The control method according to claim 14, further comprising:
- based on receiving the first mode change signal from at least one second external electronic apparatus of the plurality of external electronic apparatuses operating in the first operation mode, identifying that the server is in the communication pending state;
- transmitting the first mode change signal to at least one third external electronic apparatus of the plurality of external electronic apparatuses; and
- changing from the first operation mode to the second operation mode of the electronic apparatus.

16. The control method according to claim 15, further comprising:
- restricting the generating of information by the electronic apparatus when the electronic apparatus operates in the second operation mode.

17. The control method according to claim 14, wherein the information for use by the user terminal is generated by a sensor of the electronic apparatus.

\* \* \* \* \*